(12) United States Patent
Ishii

(10) Patent No.: US 11,673,998 B2
(45) Date of Patent: Jun. 13, 2023

(54) TRIAZINE-RING-CONTAINING POLYMER AND COMPOSITION IN WHICH SAME IS USED

(71) Applicant: IDEMITSU KOSAN CO., LTD., Chiyoda-ku (JP)

(72) Inventor: Hirotoshi Ishii, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 17/318,461

(22) Filed: May 12, 2021

(65) Prior Publication Data

US 2021/0277184 A1 Sep. 9, 2021

Related U.S. Application Data

(62) Division of application No. 16/462,774, filed as application No. PCT/JP2017/041062 on Nov. 15, 2017, now abandoned.

(30) Foreign Application Priority Data

Nov. 22, 2016 (JP) ................................ 2016-227280

(51) Int. Cl.
C08G 73/06 (2006.01)
C08L 79/04 (2006.01)

(52) U.S. Cl.
CPC .......... C08G 73/0644 (2013.01); C08L 79/04 (2013.01); C08L 2203/16 (2013.01); C08L 2203/20 (2013.01)

(58) Field of Classification Search
CPC .................. H01L 51/0067; H01L 51/0072
USPC ................................................... 528/53, 186
See application file for complete search history.

(56) References Cited

U.S. PATENT DOCUMENTS

| | | | |
|---|---|---|---|
| 8,618,243 B2 | 12/2013 | Nishimura et al. |
| 8,710,174 B2 | 4/2014 | Nishimura et al. |
| 2009/0140284 A1 | 6/2009 | Kurino et al. |
| 2012/0049308 A1 | 3/2012 | Nishimura et al. |

(Continued)

FOREIGN PATENT DOCUMENTS

| | | |
|---|---|---|
| CN | 101586033 A | 11/2009 |
| CN | 102459415 A | 5/2012 |

(Continued)

OTHER PUBLICATIONS

International Search Report dated Feb. 6, 2018 in PCT/JP2017/041062, 2 pages.

(Continued)

*Primary Examiner* — Shane Fang
(74) *Attorney, Agent, or Firm* — Oblon, McClelland, Maier & Neustadt, L.L.P.

(57) ABSTRACT

A triazine ring-containing polymer, having a structural unit represented by the following formula (1), in which a peak top molecular weight obtained by gel permeation chromatography is 19,000 or less.

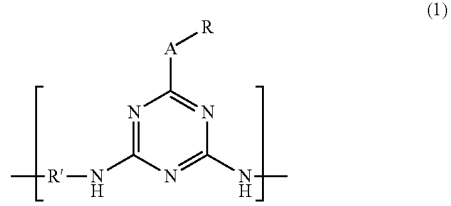

(1)

1 Claim, 1 Drawing Sheet

(56) References Cited

U.S. PATENT DOCUMENTS

| | | |
|---|---|---|
| 2013/0289203 A1 | 10/2013 | Nishimura et al. |
| 2014/0008751 A1 | 1/2014 | Nishimura et al. |
| 2015/0210808 A1 | 7/2015 | Nishimura et al. |

FOREIGN PATENT DOCUMENTS

| | | |
|---|---|---|
| CN | 103261273 A | 8/2013 |
| JP | 5-164901 A | 6/1993 |
| JP | 2005-350531 A | 12/2005 |
| JP | 2007-270099 A | 10/2007 |
| JP | 2007-308631 A | 11/2007 |
| JP | 2009-1658 A | 1/2009 |
| JP | 2011-38015 A | 2/2011 |
| JP | 2012-92261 A | 5/2012 |
| JP | 2014-162829 A | 9/2014 |
| JP | 2014-162830 A | 9/2014 |
| JP | 2015-91919 A | 5/2015 |
| TW | 201540744 A | 11/2015 |
| WO | WO 2010/128661 A1 | 11/2010 |
| WO | WO 2012/057104 A1 | 5/2012 |
| WO | WO 2012/060268 A1 | 5/2012 |
| WO | WO 2015/094420 A | 6/2015 |
| WO | WO 2016/117524 A1 | 7/2016 |
| WO | WO 2016/117531 A1 | 7/2016 |

OTHER PUBLICATIONS

English translation of the International Preliminary Report on Patentability and Written Opinion of the International Searching Authority dated Jun. 6, 2019 in PCT/JP2017/041062 filed Nov. 15, 2017, 8 pages.

Otsu, Takayuki, "Chemistry of Polymer Synthesis, Revised Version" Kagaku-Dojin Publishing Company, Inc., 1979, pp. 1-25 and cover pages.

Combined Taiwanese Office Action and Search Report dated Apr. 22, 2021 in corresponding Taiwanese Patent Application No. 106140541 (with English Translation of Category of Cited Documents), 10 pages Combined Chinese Office Action and Search Report dated Jun. 4, 2021 in Chinese Patent Application No. 201780071625.9, 11 pages.

TRIAZINE-RING-CONTAINING POLYMER AND COMPOSITION IN WHICH SAME IS USED

CROSS-REFERENCE TO RELATED APPLICATIONS

This application is a divisional of U.S. application Ser. No. 16/462,774 filed May 21, 2019, abandoned, which is a National Stage of PCT/JP2017/041062 filed Nov. 15, 2017 and claims the benefit of JP 2016-227280 filed Nov. 22, 2016.

TECHNICAL FIELD

The invention relates to a triazine ring-containing polymer, and a composition in which the same is used, a thin film, a film, a transparent plate, a lens, an electronic device, a light-emitting device and an optical device.

BACKGROUND ART

A transparent resin such as a (meth)acrylic resin including polymethyl methacrylate, a polycarbonate resin, a transparent epoxy resin and a transparent silicone resin has lighter weight and more excellent processability, as compared with glass, and therefore has come to be widely used for a windshield resin for aircraft or the like, a transparent container, a transparent coating agent or the like. Further, in recent years, a resin product such as a transparent resin lens has come to be frequently used also in the field of optical components such as spectacles.

Further, also in the field of an electronic material, the above-described transparent resin is come to be frequently used for an application of an antireflection coating agent for a liquid crystal display, a transparent coating agent for a solar battery, and an optical electronic material for a light-emitting diode, a photoreceiver of a CCD (charge-coupled device) image sensor or a CMOS (complementary metal oxide semiconductor) image sensor, or the like.

The applications of such optical electronic materials require not only transparency, but also a high refractive index for improvement in light extraction efficiency or improvement in light condensing properties in many cases.

In the conventional transparent resins, while mechanical physical properties can be controlled to some extent by a technique such as crosslinking, a special technology has been required for enhancing optical characteristics, particularly a refractive index.

Patent Documents 1 and 2 propose techniques in which a large amount of a heavy atom such as bromine and sulfur is bonded with an organic resin to improve a refractive index. Moreover, Patent Documents 3 and 4 propose techniques in which inorganic oxide fine particles having a high refractive index are dispersed into an organic resin to improve a refractive index. Further, a high refractive index material composed of a polymerizable triazine-based resin composition is also known (Patent Document 5). Patent Document 6 describes a linear triazine-ring polymer or a triazine-ring-containing hyperbranched polymer.

According to the techniques in Patent Documents 1 and 2, the obtained organic resin is generally unstable to heat or light, and therefore a problem of easily causing deterioration such as discoloration during long-term use remains, and also when the resin is used for an application of an electronic material component, corrosion of an electrode, or the like is concerned. Moreover, the techniques in Patent Documents 3 and 4 also have a problem of long-term storage stability or the like of the obtained resin in which the fine particles are dispersed, and require a large amount of a dispersion stabilizer for improving dispersion stability in the resin of the inorganic oxide fine particles, and therefore balancing between the refractive index and the dispersion stability becomes difficult.

Moreover, according to the technique in Patent Document 5, while a high heat-resistant resin with a comparatively high refractive index is obtained, resulting from a triazine ring in a resin structure, the refractive index is not sufficiently high, and further an unsaturated bonding site contributing to curing does not partially react and remains, and therefore such a problem as easily causing deterioration such as discoloration and deformation during long-term use, or the like has remained. According to Patent Document 6, the refractive index is far from sufficiently high, and such a problem has occurred that, because of a hyperbranched polymer, physical properties of the polymer to be obtained are not stabilized depending on polymerization conditions such as temperature and an agitation state, and the polymer is formed into insoluble gel depending on conditions.

Accordingly, a high refractive index material using a polymer containing a triazine ring is proposed (for example, Patent Documents 7 and 8).

CITATION LIST

Patent Document

Patent Document 1: JP-A-H5-164901
Patent Document 2: JP-A-2005-350531
Patent Document 3: JP-A-2007-270099
Patent Document 4: JP-A-2007-308631
Patent Document 5: JP-A-2011-038015
Patent Document 6: WO20101128661
Patent Document 7: JP-A-2014-162829
Patent Document 8: JP-A-2014-162830

SUMMARY OF INVENTION

An objective of the invention is to provide a triazine ring-containing polymer excellent in solubility, and a composition in which the same is used, a thin film, a film, a transparent plate, a lens, an electronic device, a light-emitting device and an optical device.

The invention provides the following triazine ring-containing polymer and the like.

1. A triazine ring-containing polymer, comprising a structural unit represented by the following formula (1), wherein a peak top molecular weight obtained by gel permeation chromatography is 19,000 or less:

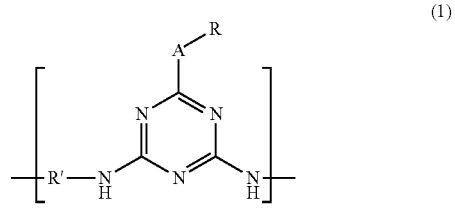

wherein, A represents a divalent group selected from the group consisting of —NH—, —NR″—, —NH—(C=O)—, —NR″—(C=O)—, —S— and —O—;

R' represents a divalent aliphatic hydrocarbon group, a divalent aromatic hydrocarbon group, or a divalent group which is a combination of (i) one or more selected from the group consisting of one or more divalent aliphatic hydrocarbon groups and one or more divalent aromatic hydrocarbon groups, and (ii) one or more selected from the group consisting of a single bond, —S—, —S(=O)$_2$—, —O—, —NH—, —NR"—, —(C=O)—NH—, —O—(C=O)—O—, —(C=O)—O— and —(C=O)—; and R' may be further substituted with a substituent;

R represents a hydrogen atom, an aliphatic hydrocarbon group, an aromatic hydrocarbon group, an aliphatic hydrocarbon group having a group which is a combination of an aromatic hydrocarbon group and one or more selected from the group consisting of a single bond, —S—, —S(=O)$_2$—, —O—, —NH—, —NR"—, —(C=O)—NH—, —O—(C=O)—O—, —(C=O)—O— and —(C=O)—, an aromatic hydrocarbon group having a group which is a combination of an aliphatic hydrocarbon group and one or more selected from the group consisting of a single bond, —S—, —S(=O)$_2$—, —O—, —NH—, —NR"—, —(C=O)—NH—, —O—(C=O)—O—, —(C=O)—O— and —(C=O)—, or an acetyl group; and R may be further substituted with a substituent;

R" represents an aliphatic hydrocarbon group, an aromatic hydrocarbon group, or a group which is a combination of one or more aliphatic hydrocarbon groups and one or more aromatic hydrocarbon groups; and when a plurality of R' exist, the plurality of R" may be the same with or different from each other.

2. The triazine ring-containing polymer according to 1, wherein an end group contains an amino group, —NHR$^1$ or —N(R$^1$)$_2$, wherein R$^1$ independently represents —Si(R")$_3$, —Si(OR")$_3$, a group which is a combination of —Si(OR")$_3$ and a divalent group, R$^a$—(C=O)—, an aliphatic hydrocarbon group, an aromatic hydrocarbon group, an aliphatic hydrocarbon group having a group which is a combination of an aromatic hydrocarbon group and one or more selected from the group consisting of a single bond, —S—, —S(=O)$_2$—, —O—, —NH—, —NR"—, —(C=O)—NH—, —O—(C=O)—O—, —(C=O)—O—, —(C=O)—, a silylene group and a siloxylene group, or an aromatic hydrocarbon group having a group which is a combination of an aliphatic hydrocarbon group and one or more selected from the group consisting of a single bond, —S—, —S(=O)$_2$—, —O—, —NH—, —NR"—, —(C=O)—NH—, —O—(C=O)—O—, —(C=O)—O—, —(C=O)—, a silylene group and a siloxylene group;

R$^1$ may be further substituted with a substituent;

R$^a$ represents an aliphatic hydrocarbon group, an aromatic hydrocarbon group, or an aliphatic hydrocarbon group having an aromatic hydrocarbon group; and R" represents an aliphatic hydrocarbon group, an aromatic hydrocarbon group, or a group which is a combination of one or more aliphatic hydrocarbon groups and one or more aromatic hydrocarbon groups.

3. The triazine ring-containing polymer according to 1 or 2, wherein an extinction coefficient at a wavelength of 400 nm is 0.01 or less.

4. The triazine ring-containing polymer according to any one of 1 to 3, wherein R is an aliphatic hydrocarbon group which may have a substituent or an aromatic hydrocarbon group which may have a substituent, and R' is a divalent group represented by any of the following formulas (5) to (11):

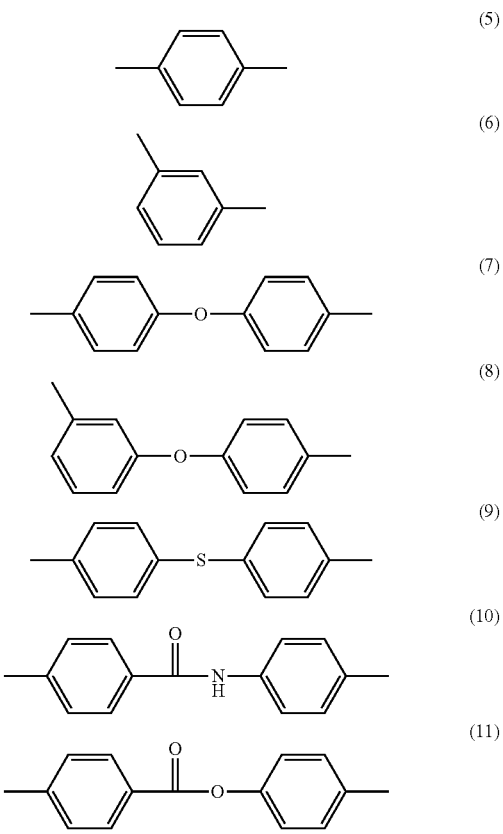

5. The triazine ring-containing polymer according to any one of 1 to 4, wherein R is a phenyl group, a p-cyanophenyl group or a p-nitrophenyl group.

6. A composition, comprising the triazine ring-containing polymer according to any one of 1 to 5, and an organic solvent.

7. The composition according to 6, further comprising one or more selected from the group consisting of an organic polymer, an inorganic polymer and an organic-inorganic hybrid polymer.

8. The composition according to 6 or 7, further comprising an ultraviolet curing agent or a thermosetting agent.

9. A thin film, a film, a transparent plate or a lens, prepared by using the triazine ring-containing polymer according to any one of 1 to 5 or the composition according to any one of 6 to 8.

10. An electronic device, a light-emitting device or an optical device, comprising the thin film, the film, the transparent plate or the lens according to 9.

The invention can provide a triazine ring-containing polymer excellent in solubility, and a composition in which the same is used, a thin film, a film, a transparent plate, a lens, an electronic device, a light-emitting device and an optical device.

DESCRIPTION OF EMBODIMENTS

Figure 1:
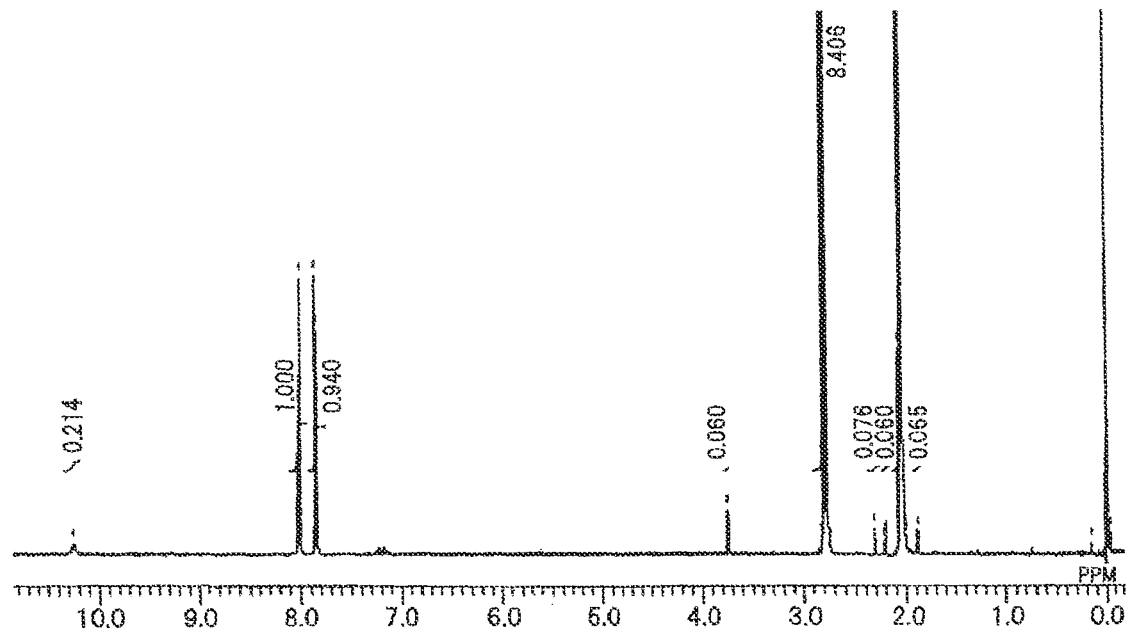
FIG. 1 shows an NMR chart of a compound A-1 obtained in Synthesis Example 1.

A triazine ring-containing polymer of the invention has a structural unit represented by the following formula (1), in which a peak top molecular weight obtained by gel permeation chromatography is 19,000 or less.

Thus, solubility in a solvent can be improved, the polymer is dissolved in various solvents, and a coating liquid (application liquid) for obtaining a thin film, a film, a transparent plate or a lens having a high refractive index can be prepared.

Further, a material giving a higher refractive index, as compared with a conventional high-refractive index material, can be obtained without using a heavy atom involving a problem such as instability to heat or light, and electrode corrosion, or a resin in which inorganic oxide fine particles are dispersed, having a problem of long-term storage stability or a balance between a refractive index and dispersion stability.

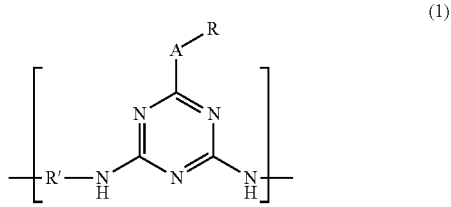

(1)

Wherein, A represents a divalent group selected from the group consisting of —NH—, —NR"—, —NH—(C=O)—, —NR"—(C=O)—, —S— and —O— (preferably —NH—, —NH—(C=O)— or —S—);

R' represents a divalent aliphatic hydrocarbon group, a divalent aromatic hydrocarbon group, or a divalent group which is a combination of (i) one or more selected from the group consisting of one or more divalent aliphatic hydrocarbon groups and one or more divalent aromatic hydrocarbon groups, and (ii) one or more selected from the group consisting of a single bond, —S—, —S(=O)$_2$—, —O—, —NH—, —NR"—, —(C=O)—NH—, —O—(C=O)—O—, —(C=O)—O— and —(C=O)—; and R' may be further substituted with a substituent;

R represents a hydrogen atom, an aliphatic hydrocarbon group, an aromatic hydrocarbon group, an aliphatic hydrocarbon group having a group which is a combination of an aromatic hydrocarbon group and one or more selected from the group consisting of a single bond, —S—, —S(=O)$_2$—, —O—, —NH—, —NR"—, —(C=O)—NH—, —O—(C=O)—O—, —(C=O)—O— and —(C=O)—, an aromatic hydrocarbon group having a group which is a combination of an aliphatic hydrocarbon group and one or more selected from the group consisting of a single bond, —S—, —S(=O)$_2$—, —O—, —NH—, —NR"—, —(C=O)—NH—, —O—(C=O)—O—, —(C=O)—O— and —(C=O)—, or an acetyl group; and R may be further substituted with a substituent;

R" represents an aliphatic hydrocarbon group, an aromatic hydrocarbon group, or a group which is a combination of one or more aliphatic hydrocarbon groups and one or more aromatic hydrocarbon groups; and when a plurality of R" exist, the plurality of R" may be the same with or different from each other.

In the triazine ring-containing polymer of the invention, the peak top molecular weight obtained by gel permeation chromatography (GPO) is 19,000 or less, preferably 10,000 or less, and more preferably 8,000 or less, and from a viewpoint of solubility in isophorone or PGME (1-methoxy-2-propanol), further preferably 5,000 or less, and particularly preferably 3,000 or less. A lower limit is not particularly limited, but is 500 or more or 1000 or more, for example.

When the peak top molecular weight is 19,000 or less, the solubility in the solvent increases, and the application liquid having a suitable concentration can be prepared.

The peak top molecular weight Mp of the triazine ring-containing polymer of the invention can be determined, for example, by obtaining an equivalent to standard polystyrene for a molecular weight indicated by the peak top of a chromatography chart obtained by the gel permeation chromatography using a column for size exclusion chromatography.

In the triazine ring-containing polymer of the invention, the extinction coefficient $k_{400}$ at a wavelength of 400 nm is preferably 0.5 or less, more preferably 0.1 or less, further preferably 0.01 or less, and particularly preferably 0.005. A lower limit is not particularly limited, but is 0.001, for example.

The lower limit is 0.5 or less, whereby transparency in a visible light wavelength region is high, and visually observed coloration can be reduced.

The extinction coefficient can be measured by preparing the thin film and using a spectroscopic ellipsometer, for example.

In the triazine ring-containing polymer of the invention, a refractive index $n_D$ of a D line (589.3 nm) is preferably 1.7 or more. An upper limit is not particularly limited, but is 1.9999, for example. Thus, for example, a transparent thin film having higher reflectance, a thinner microlens array, or the like can be realized.

The Abbe number is preferably 5 or more. An upper limit is not particularly limited, but is 15, for example. Thus, for example, an optical thin film having small chromatic aberration can be realized.

The Abbe number means a numerical value representing wavelength dispersion of the refractive index, and can be calculated by using the refractive indices of a D line (589.3 nm), an F line (486.1 nm), and a C line (656.3 nm).

The refractive indices ($n_D$, $n_F$, and $n_C$) and the Abbe number can be measured by using the spectroscopic ellipsometer, for example.

In the formula (1), the number of carbon atoms of the divalent aliphatic hydrocarbon group of R' is preferably 1 to 20. The number of ring carbon atoms of the divalent aromatic hydrocarbon group is preferably 6 to 20, and more preferably 6 to 10.

In R', the divalent group which is the combination of (i) one or more (preferably two or more, more preferably two to three, and further preferably two) selected from the group consisting of one or more (preferably two or more, more preferably two to three, and further preferably two) divalent aliphatic hydrocarbon groups and one or more (preferably two or more, more preferably two to three, and further preferably two) divalent aromatic hydrocarbon groups, and (ii) one or more selected from the group consisting of the single bond, —S—, —S(=O)$_2$—, —O—, —NH—, —NR"—, —(C=O)—NH—, —O—(C=O)—O—, —(C=O)—O— and —(C=O)— is preferably a combination of two divalent aromatic hydrocarbon groups and one selected from the group consisting of —S—, —O—, —NH—, —NR"—, —(C=O)—NH—, —O—(C=O)—O—, —(C=O)—O— and —(C=O)—.

When a plurality of divalent aromatic hydrocarbon groups of R' exist, the plurality of divalent aromatic hydrocarbon groups may be the same with or different from each other.

When a plurality of divalent aliphatic hydrocarbon groups of R' exist, the plurality of divalent aliphatic hydrocarbon groups may be the same with or different from each other.

R' is preferably a divalent aromatic hydrocarbon group, or a divalent group which is a combination of one or more divalent aromatic hydrocarbon groups and one or more selected from the group consisting of —S—, —O—, —NH—, —NR''—, —(C=O)—NH—, —O—(C=O)—O—, —(C=O)—O— and —(C=O)—, and more preferably a divalent aromatic hydrocarbon group.

R' is preferably a divalent group represented by any of the following formulas (5) to (11) from a viewpoint of the refractive index.

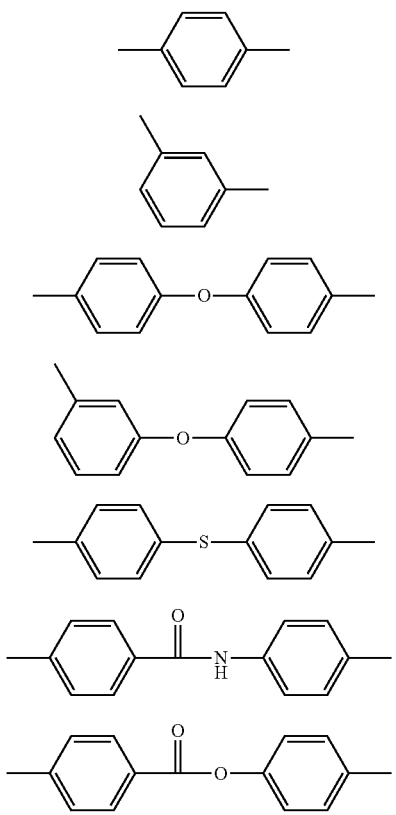

R' may be further substituted with a substituent and the substituents will be described later.

The number of carbon atoms of the aliphatic hydrocarbon group of R is preferably 1 to 20. The number of ring carbon atoms of the aromatic hydrocarbon group is preferably 6 to 20, and more preferably 6 to 10.

R is preferably an aromatic hydrocarbon group having 6 to 10 ring carbon atoms or an aromatic hydrocarbon group having a substituent and 6 to 10 ring carbon atoms, and more preferably an aromatic hydrocarbon group having a substituent and 6 to 10 ring carbon atoms.

R may be further substituted with a substituent and the substituents will be described later.

R is preferably an aliphatic hydrocarbon group which may have a substituent or an aromatic hydrocarbon group which may have a substituent, from a viewpoint of the refractive index.

R is preferably a phenyl group, a p-cyanophenyl group or a p-nitrophenyl group. Thus, the refractive index can be further enhanced.

The number of carbon atoms of the aliphatic hydrocarbon group of R'' is preferably 1 to 20. The number of ring carbon atoms of the aromatic hydrocarbon group is preferably 6 to 20, and more preferably 6 to 10.

R is preferably an aliphatic hydrocarbon group which may have a substituent, or an aromatic hydrocarbon group which may have a substituent, and R' is preferably a divalent group represented by any of the formulas (5) to (11). Thus, the refractive index can be further enhanced.

Specific examples of the above-described substituent include an alkyl group having 1 to 20 carbon atoms, a monocyclic or polycyclic cycloalkyl group having 3 to 20 carbon atoms, an aralkyl group having 7 to 20 carbon atoms, an aromatic hydrocarbon group (having preferably 6 to 20 ring carbon atoms, and more preferably 6 to 10 ring carbon atoms), a heterocyclic group (having preferably 3 to 20 ring atoms, and more preferably 3 to 10 ring atoms), and a heteroatom-containing substituent.

Specific examples of the above-described aliphatic hydrocarbon group include an alkyl group having 1 to 20 carbon atoms, and a monocyclic or polycyclic cycloalkyl group having 3 to 20 carbon atoms, and specific examples of the alkyl group include a methyl group, an ethyl group, a propyl group, an isopropyl group, a n-butyl group, a s-butyl group, an isobutyl group, a t-butyl group, a n-pentyl group, a n-hexyl group, a n-heptyl group and a n-octyl group.

Specific examples of the cycloalkyl group include a group formed into an aliphatic ring structure in the above-described example of the alkyl group having 3 or more carbon atoms, and specific examples thereof include a cyclopentyl group and a cyclohexyl group.

Specific examples of the divalent aliphatic hydrocarbon group include a group formed by eliminating one hydrogen atom from the above-described group.

Specific examples of the above-described aromatic hydrocarbon group (aryl group) include a phenyl group, a 1-naphthyl group, a 2-naphthyl group, a 1-anthryl group, a 2-anthryl group, a 9-anthryl group, a 1-phenanthryl group, a 2-phenanthryl group, a 3-phenanthryl group, a 4-phenanthryl group, a 9-phenanthryl group, a naphthacenyl group, a chrysenyl group, a benzo[c]phenanthryl group, a benzo[g]chrysenyl group, a triphenylenyl group, a 1-fluorenyl group, a 2-fluorenyl group, a 3-fluorenyl group, a 4-fluorenyl group, a 9-fluorenyl group, a benzofluorenyl group, a dibenzofluorenyl group, a 2-biphenylyl group, a 3-biphenylyl group, a 4-biphenylyl group, a terphenyl group and a fluoranthenyl group.

Specific examples of the divalent aromatic hydrocarbon group include a group formed by eliminating one hydrogen atom from the above-described group.

Specific examples of the aralkyl group include a group formed by substituting a hydrogen atom of the above-described alkyl group for the above-described aryl group.

Specific examples of the heterocyclic group include a group formed of a pyrrole ring, an isoindole ring, a benzofuran ring, an isobenzofuran ring, a dibenzothiophene ring, an isoquinoline ring, a quinoxaline ring, a phenanthridine ring, a phenanthroline ring, a pyridine ring, a pyrazine ring, a pyrimidine ring, a pyridazine ring, a triazine ring, an indole ring, a quinoline ring, an acridine ring, a pyrrolidine ring, a dioxane ring, a piperidine ring, a morpholine ring, a piperazine ring, a furan ring, a thiophene ring, an oxazole ring, an oxadiazole ring, a benzoxazole ring, a thiazole ring, a thiadiazole ring, a benzothiazole ring, a triazole ring, an imidazole ring, a benzimidazole ring, a pyran ring, a dibenzofuran ring, a benzo[c]dibenzofuran ring, a carbazole ring, and a derivative thereof.

Specific examples of the heteroatom-containing substituent include a cyano group, an amino group, an alkylamino group, an arylamino group, a nitro group, a thiol group, an alkylmercapto group, an arylmercapto group, an alkoxycarbonyl group or an alkoxycarbonyloxy group, a carbamoyl group and $-NR^2-C(=O)R^3$ (wherein, $R^2$ and $R^3$ are independently a hydrogen atom or an aliphatic hydrocarbon group), and a cyano group, a nitro group, an alkylmercapto group, an arylmercapto group, a carbamoyl group or $-NR^2-C(=O)R^3$ is preferable.

Specific examples of the alkylamino group include a group formed by substituting one or two hydrogen atoms of the amino group for the above-described alkyl group, and specific examples thereof include a methylamino group, a dimethylamino group, an ethylamino group, a n-propylamino group, an isopropylamino group and a cyclohexylamino group.

Specific examples of the arylamino group include a group formed by substituting one or two hydrogen atoms of the amino group for the above-described aryl group, and specific example thereof include an anilino group, a toluidino group, a mesidino group, or an anilino group having a heteroatom-containing group such as a nitrogen atom-containing group, an oxygen atom-containing group and a sulfur atom-containing group.

Specific examples of the alkylmercapto group include a group formed by substituting a hydrogen atom of the mercapto group for the above-described alkyl group, and specific example thereof include a methylthio group, an ethylthio group, a n-propylthio group and an isopropylthio group.

Specific examples of the arylmercapto group include a group formed by substituting a hydrogen atom of the mercapto group for the above-described aryl group, and specific examples thereof include a phenylthio group and a naphthylthio group.

Specific examples of the alkoxycarbonyl group include a group formed by bonding the above-described alkyl group, an oxygen atom and a carbonyl group in this order, and specific examples thereof include a methoxycarbonyl group and an ethoxycarbonyl group.

Specific examples of the alkoxy carbonyloxy group include a group formed by bonding the above-described alkyl group, a carbonyl group and an oxygen atom in this order, and specific examples thereof include a methoxycarbonyloxy group and an ethoxycarbonyloxy group.

Specific examples of the aliphatic hydrocarbon group of $R^2$ and $R^3$ include a group similar to the aliphatic hydrocarbon group of R.

In the triazine ring-containing polymer, the end group preferably contains an amino group, $-NHR^1$ or $-N(R^1)_2$, and more preferably contains $-NHR^1$ or $-N(R^1)_2$ from viewpoints of improvement in solubility, suppression of deterioration during storage in association with remaining of an active end, and reduction of the coloration.

$R^1$ independently represents $-Si(R'')_3$, $-Si(OR'')_3$, a group which is a combination of $-Si(OR'')_3$ and a divalent group, $R^a-(C=O)-$, an aliphatic hydrocarbon group, an aromatic hydrocarbon group, an aliphatic hydrocarbon group having a group which is a combination of an aromatic hydrocarbon group and one or more selected from the group consisting of a single bond, $-S-$, $-S(=O)_2-$, $-O-$, $-NH-$, $-NR''-$, $-(C=O)-NH-$, $-(C=O)-O-$, $-(C=O)-$, a silylene group and a siloxylene group, or an aromatic hydrocarbon group having a group which is a combination of an aliphatic hydrocarbon group and one or more selected from the group consisting of a single bond, $-S-$, $-S(=O)_2-$, $-O-$, $-NH-$, $-NR''-$, $-(C=O)-NH-$, $-O-(C=O)-O-$, $-(C=O)-O-$, $-(C=O)-$, a silylene group and a siloxylene group.

$R^1$ may be further substituted with a substituent.

$R^a$ represents an aliphatic hydrocarbon group, an aromatic hydrocarbon group, or an aliphatic hydrocarbon group having an aromatic hydrocarbon group.

$R''$ represents an aliphatic hydrocarbon group, an aromatic hydrocarbon group, or a group which is a combination of one or more aliphatic hydrocarbon groups and one or more aromatic hydrocarbon groups.

The "divalent group" in the "group which is the combination of $-Si(OR'')_3$ and the divalent group" is R' in the formula (1), for example.

Specific examples of the aliphatic hydrocarbon group in $R^1$, $R^a$ and $R''$ include a group similar to the aliphatic hydrocarbon group of R in the formula (1).

Specific examples of the aromatic hydrocarbon group in $R^1$, $R^a$ and $R''$ include a group similar to the aromatic hydrocarbon group of R in the formula (1).

In $R^1$, specific examples of the substituent which may be further substituted include a group similar to the substitute which may be substituted, of R' and R in the formula (1).

The end group is preferably isophorone, and from a viewpoint of solubility in PGME, a 4-isopropylphenylamino group, a phenylamino group, a n-butylamino group, a 3-(trimethoxysilyl)propylamino group, a 3-[3'-(trimethoxysilyl)aminopropyl]aminopropylamino group and a bis(trimethylsilyl)amino group, and particularly preferably a n-butylamino group, a 3-(trimethoxysilyl)propylamino group, a 3-[3'-(trimethoxysilyl)aminopropyl]aminopropylamino group and a bis(trimethylsilyl)amino group.

The triazine ring-containing polymer of the invention can be manufactured, for example, by allowing a polymerization reaction between a dichloro monomer of a triazine ring having R-A- and a diamine monomer represented by $NH_2-R'-NH_2$ (R and R' are as defined in the formula (1)).

As a polymerization solvent, super dehydrated N,N-dimethylacetamide, super dehydrated N,N-dimethylformamide, guaranteed N,N-dimethylacetamide, guaranteed N,N-dimethylformamide, super dehydrated N-methyl-2-pyrrolidone, guaranteed N-methyl-2-pyrrolidone, guaranteed 1,3-dimethyl-2-imidazolidinone or the like may be used. From viewpoints of the solubility of the dichloro monomer of the triazine ring having R-A-, the solubility of the diamine monomer represented by $NH_2-R'-NH_2$, suppression of the coloration and reduction of the extinction coefficient, super dehydrated N,N-dimethylacetamide, super dehydrated N,N-dimethylformamide or super dehydrated N-methyl-2-pyrrolidone is preferable.

A polymerization atmosphere may be under a nitrogen atmosphere, under atmospheric air, under reduced pressure, in vacuum, under pressure of nitrogen or the like. From viewpoints of simplicity of a manufacturing apparatus, suppression of the coloration and reduction of the extinction coefficient, a state under a nitrogen atmosphere is preferable.

A polymerization temperature is ordinarily 50° C. or higher, and from viewpoints of suppression of the coloration and improvement in the solubility, preferably 80° C. or higher, and more preferably 120° C. or higher. An upper limit is not particularly limited, but is preferably 200° C. or lower.

A polymerization tame is ordinarily 1 to 24 hours.

After the polymerization reaction, an end-capping agent may be added thereto and allowed to react with the polymer.

Specific examples of the end-capping agent include $NH_2R^1$, $NH(R^1)_2$ and carboxylic anhydride ($R^1$ is as defined in $R^1$ of the above-described end group).

Thus, the solubility can be improved, the deterioration during storage in association with remaining of the active end can be suppressed, and the coloration can be reduced.

A reaction temperature of the end-capping agent is ordinarily 100 to 200° C., and a reaction time is ordinarily 1 to 24 hours.

The peak top molecular weight of the triazine ring-containing polymer to be obtained can be adjusted by taking into account the solubility of the diamine monomer to be used in the polymerization solvent, interaction of the polymerization solvent to be used to the polymerization reaction, the polymerization temperature, and the like.

Specific examples of the carboxylic anhydride include acetic anhydride, propionic anhydride, succinic anhydride and maleic anhydride.

From a viewpoint of suppressing the coloration, it is preferable to heat the diamine monomer, and add the dichloro monomer thereto.

A composition of the invention contains the triazine ring-containing polymer of the invention and the organic solvent.

A content of the triazine ring-containing polymer is selected in the range of 0.1 to 50% by mass based on the total composition, for example.

As the organic solvent, any solvent can be used in the range in which the above-described triazine ring-containing polymer is dissolved therein, and specific examples thereof include an amide-based solvent such as N-methyl-2-pyrrolidone, N,N-dimethylformamide, N,N-dimethylacetamide and 1,3-dimethyl-2-imidazolidinone; a halogen-based solvent such as 1,1,2,2-tetrachloroethane, chloroform and dichloromethane; a ketone-based solvent such as cyclohexanone and methyl ethyl ketone; an ester-based solvent such as ethyl acetate; an ether-based solvent such as tetrahydrofuran; an glyme-based solvent such as 1-methoxy-2-propanol and diethylene glycol monoethyl ether; and isophorone.

From a viewpoint of the solubility of the triazine ring-containing polymer, an amide-based solvent is preferable. Moreover, from a viewpoint of toxicity, a glyme-based solvent or isophorone is preferable.

A content of the organic solvent cannot be unconditionally defined depending on a kind of the triazine ring-containing polymer to be used, a kind of the solvent, an application of the composition or use conditions or the like, but is ordinarily 50 to 99.9% by mass based on the total composition.

The composition of the invention may contain a polymer other than the triazine ring-containing polymer. Specific examples of the polymer other than the triazine ring-containing polymer include an organic polymer, an inorganic polymer and an organic-inorganic hybrid polymer.

Specific examples of the organic polymer include polyacrylate, polymethacrylate, polycarbonate, polyimide, polyamide and an epoxy resin.

Specific examples of the inorganic polymer include polysiloxane, polytitanoxane and polyzirconoxane.

Specific examples of the organic-inorganic hybrid polymer include polyalkylsiloxane.

The polymers other than the triazine ring-containing polymer may be used alone in one kind, or in combination of two or more kinds.

When the composition contains the polymer other than the triazine ring-containing polymer, a content of the polymer other than the triazine ring-containing polymer is preferably 0.1 to 99.9% by mass based on the total composition.

Moreover, the composition of the invention may contain an ultraviolet curing agent.

Specific examples of the ultraviolet curing agent include a conventionally-known agent, such as persulfate including ammonium persulfate, an azo compound including 4,4'-azobis(4-cyanovaleric acid); a diacyl peroxide compound including isobutyryl peroxide; and a peroxydicarbonate compound including bis(4-t-butylcyclohexyl)peroxydicarbonate.

When the composition contains the ultraviolet curing agent, a content of the ultraviolet curing agent is preferably 0.001 to 10% by mass based on the total composition.

The composition of the invention may contain a thermosetting agent.

Specific examples of the thermosetting agent include a publicly-known agent, such as an aliphatic amine-based curing agent for an epoxy resin and a polyisocyanate-based curing agent.

When the composition contains the thermosetting agent, a content of the thermosetting agent is preferably 0.01 to 30% by mass based on the total composition.

Moreover, as any other additive, a curing catalyst, a stabilizer, a film-thickness adjusting material, a leveling material, a transparent improving material, a strength improving material or the like may be added thereto. A kind thereof, an amount of addition or the like may be appropriately adjusted according to the triazine ring-containing polymer or the like contained in the composition.

The composition of the invention consists essentially of the triazine ring-containing polymer, and the organic solvent, and arbitrarily the polymer other than the triazine ring-containing polymer, the ultraviolet curing agent and the thermosetting agent, and may contain inevitable impurities in addition thereto within the range in which advantageous effects of the invention are not adversely affected.

For example, 80% by mass or more, 90% by mass or more, 95% by mass or more, 98% by mass or more or 100% by mass of the composition of the invention may be composed of:

the triazine ring-containing polymer, and the organic solvent; or the triazine ring-containing polymer, and the organic solvent, and arbitrarily the polymer other than the triazine ring-containing polymer, the ultraviolet curing agent and the thermosetting agent.

The thin film, the film, the transparent plate, the lens, or the like can be prepared by using the triazine ring-containing polymer of the invention or the composition of the invention.

The thin film, the film, the transparent plate and the lens of the invention can be used for an electronic device, a light-emitting device or an optical device.

The thin film of the invention is preferably manufactured by applying the above-described composition onto a substrate.

The substrate is not particularly limited, and a publicly-known substrate can be used. Specific examples thereof include a glass substrate, a synthetic quartz substrate, a silicon substrate and a resin film substrate such as a polyethylene terephthalate substrate, a polyethylene naphthalate substrate and a cycloolefin copolymer substrate.

Moreover, an application method is not particularly limited, and a publicly-known method can be used. Specific examples thereof include spin coating, bar coating, flow coating, casting, dip coating and spray coating.

Drying may be performed after coating.

A drying temperature is ordinarily 50 to 300° C. A drying time is ordinarily 30 seconds to 1 hour.

EXAMPLES

Synthesis Example 1

In a 500 mL three-necked flask equipped with a low-temperature thermometer of −50° C. to 50° C., a 100 mL dropping funnel and a Dimroth condenser, an acetone 200 mL solution of 18.44 g (100 mmol) of cyanuric chloride was put, and the resulting mixture was cooled to 0° C. in a salt/ice bath. While the cooled solution was stirred, an acetone 50 mL solution of 11.81 g (100 mmol) of 4-cyanoaniline was added dropwise thereto for 20 minutes from the dropping funnel while confirming that a temperature of a reaction liquid was not more than 5° C., and after completion of dropwise addition, the resulting mixture was stirred at 5° C. for 1 hour. Then, contents were charged into 500 mL of pure water, and a precipitated solid was filtered off. The resulting solid washed with 500 mL of pure water until wash water became neutral was dried under reduced pressure at 80° C. for 8 hours to obtain 25.97 g (97.60 mmol, yield: 97.6%) of 2-(4-cyanoanilino)-4,6-dichlorotriazine (compound (compound A-1) represented by the following formula (A-1)). An NMR chart of the compound A-1 obtained is shown in FIG. 1.

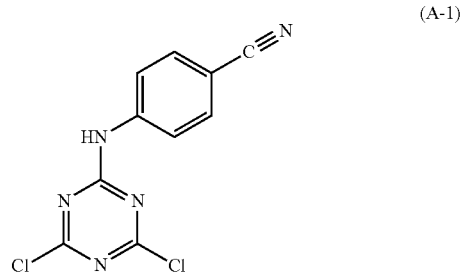 [SMILES: N#Cc1ccc(Nc2nc(Cl)nc(Cl)n2)cc1]

(A-1)

Synthesis Example 2

A compound A-2 (compound represented by the following formula (A-2)) was obtained in the same manner as in Synthesis Example 1 except that 13.81 g (100 mmol) of 4-nitroaniline was used in place of 11.81 g (100 mmol) of 4-cyanoaniline.

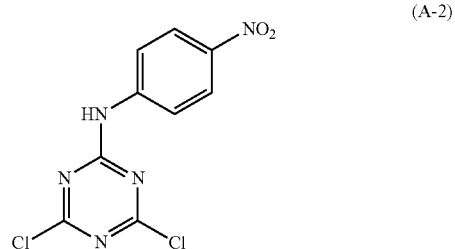 [SMILES: O=[N+]([O-])c1ccc(Nc2nc(Cl)nc(Cl)n2)cc1]

(A-2)

Synthesis Example 3

A compound A-3 (compound represented by the following formula (A-3)) was obtained in the same manner as in Synthesis Example 1 except that 9.31 g (100 mmol) of aniline was used in place of 11.81 g (100 mmol) of 4-cyanoaniline.

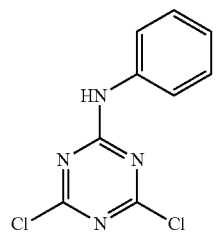

(A-3)

Example 1

In a 100 mL three-necked flask equipped with a 200° C. thermometer and a Dimroth condenser, 0.54 g (5 mmol) of p-phenylenediamine was put as a diamine monomer, and an atmosphere was replaced by nitrogen. In this three-necked flask, 5 mL of super dehydrated N,N-dimethylacetamide (made by Wako Pure Chemical Industries, Ltd., hereinafter, referred to as super dehydrated DMA) was put as a polymerization solvent under nitrogen flow, and the resulting mixture was stirred for 5 minutes in an oil bath previously set to 150° C. and was dissolved. Into this solution, a solution prepared by using 1.33 g (5 mmol) of 2-(4-cyanoanilino)-4,6-dichlorotriazine (compound A-1) obtained in Synthesis Example 1 as a dichloro monomer and 7.5 mL of super dehydrated DMA under nitrogen flow was charged by using a syringe under nitrogen flow, and the resulting solution was stirred at a polymerization temperature of 150° C. for 4 hours under nitrogen flow, and the polymerization was proceeded.

Then, 0.71 mL (5 mmol) of 4-isopropylaniline was charged thereinto as an end-capping agent by using a syringe under nitrogen flow, and the resulting solution was stirred at 150° C. for 2 hours to perform an end-capping reaction, and then the reaction solution was left to cool to room temperature.

Figure 2:
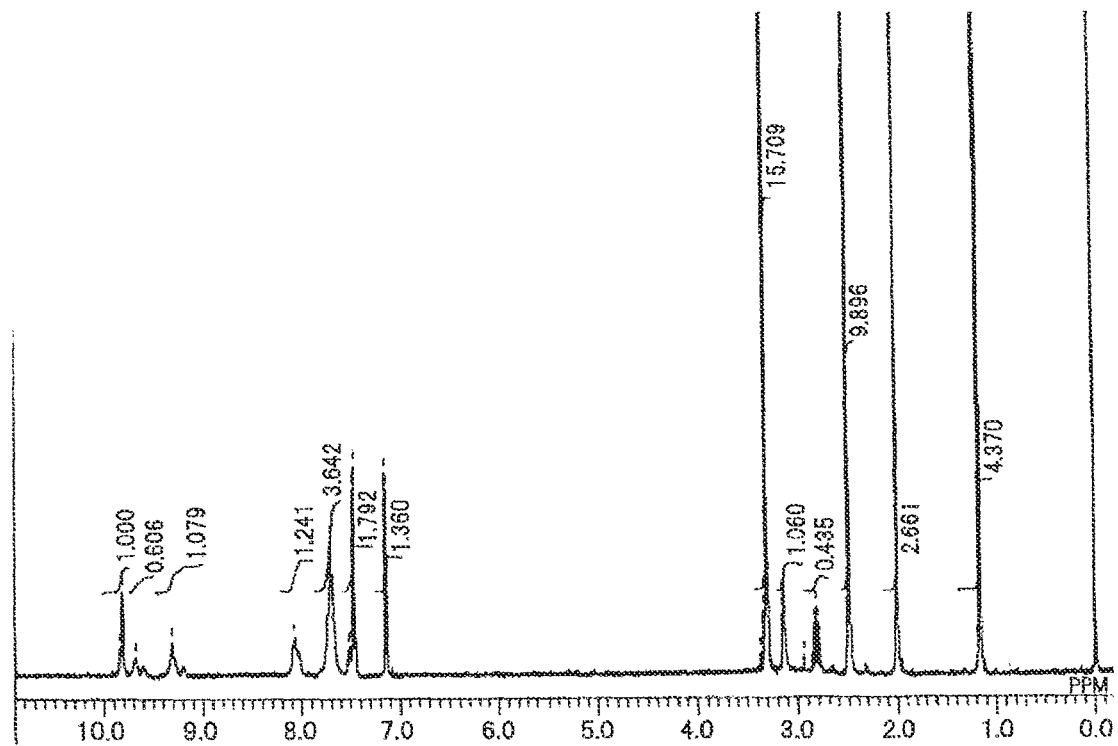
FIG. 2 shows an NMR chart of a triazine ring-containing polymer obtained in Example 1.

This solution was charged into 100 mL of 1.25% ammonia water, and a precipitated solid was filtered off. This solid was washed with ion exchange water, and dried under reduced pressure at 120° C. for 2 hours to obtain a white polymer (mixture of a polymer represented by the following formula (B-1) and a polymer represented by the following formula (B-1') in which only an end group is different (wherein, each formula indicates that a structural unit in brackets is repeated)). An NMR chart of the polymer obtained is shown in FIG. 2.

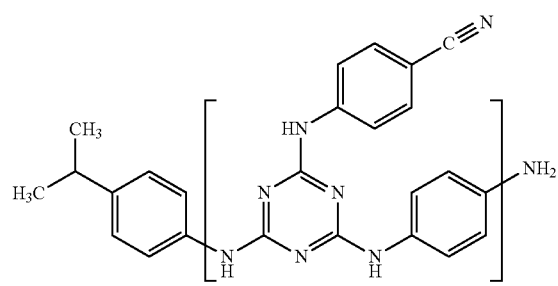
(B-1)

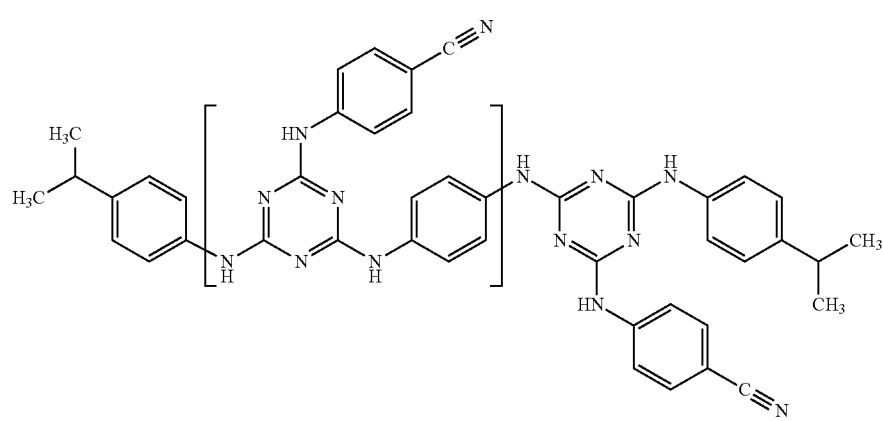
(B-1')

A peak top molecular weight ftp of the polymer obtained was determined by gel permeation chromatography (GPC) under the following measurement conditions. The results are shown in Table 1.

In addition, only the end group is different between the polymer represented by the formula (B-1) and the polymer represented by the formula (B-1'), and the peak top molecular weight is substantially the same between both polymers.

Apparatus: Alliance e2695 (made by Waters Corporation)
Detector: differential refractometer
Column: Shodex KF-806M (made by Showa Denko K.K.), two columns
Column temperature: 60° C.
Solvent: N-methyl-2-pyrrolidone solution of LiBr (0.01 M)
Flow rate: 0.7 mL per minute
Sample concentration: 0.1 w/v % (solution prepared by dissolving 10 mg of a sample in 10 mL of the above-described solvent)
Sample injection volume: 100 μL
Standard sample: TSK standard polystyrene (made by Tosoh Corporation)

(Solubility in Isophorone 1)

The above-described polymer was mixed with isophorone to be 10% by weight. A dissolved state thereof was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution was colored, or a case where the solution became cloudy is taken as marginal. A case where the polymer was not dissolved therein is taken as poor. The results are shown in Table 1.

(Solubility in Isophorone 2)

The above-described polymer was mixed with isophorone to be 20% by weight. A dissolved state thereof was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution was colored, or a case where the solution became cloudy is taken as marginal. A case where the polymer was not dissolved therein is taken as poor. The results are shown in Table 1.

(Solubility in PGME 1)

The above-described polymer was mixed with PGME (1-methoxy-2-propanol) to be 10% by weight. A state of dissolution was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution was colored, or a case where the solution became cloudy is taken as marginal. A case where the polymer was not dissolved therein is taken as poor. The results are shown in Table 1.

(Solubility in PGME 2)

The above-described polymer was mixed with PGME to be 20% by weight. A state of dissolution was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution became cloudy is taken as marginal, A case where the polymer was not dissolved therein is taken as poor. The results are shown in Table 1.

(Solubility in DMA 1)

The above-described polymer was mixed with DMA (N,N-di ethylacetamide) to be 10% by weight. A state of dissolution was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution was colored, or a case where the solution became cloudy is taken as marginal. A case where the polymer was not dissolved therein is taken as poor. The results are shown in Table 1.

(Solubility in DMA 2)

The above-described polymer was mixed with DMA to be 20% by weight. A state of dissolution was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution was colored, or a case where the solution became cloudy is taken as marginal. A case where the polymer was not dissolved therein is taken as poor. The results are shown in Table 1.

(Solubility in DMF 1)

The above-described polymer was mixed with DMF (N,N-dimethylformamide) to be 10% by weight. A state of dissolution was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution was colored, or a case where the solution became cloudy is taken as marginal, A case where the polymer was not dissolved therein is taken as poor. The results are shown in Table 1.

(Solubility in DMF 2)

The above-described polymer was mixed with DMF so as to be 20% by weight. A state of dissolution was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution was colored, or a case where the solution became cloudy is taken as marginal. A case where the polymer was not dissolved therein is taken as poor. The results are shown in Table 1.

(Solubility in NMP 1)

The above-described polymer was mixed with NMP (N-methyl-2-pyrrolidone) to be 10% by weight. A state of dissolution was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution was colored, or a case where the solution became cloudy is taken as marginal. A case where the polymer was not dissolved therein is taken as poor. The results are shown in Table 1.

(Solubility in NMP 2)

The above-described polymer was mixed with NMP so as to be 20% by weight. A state of dissolution was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution was colored, or a case where the solution became cloudy is taken as marginal, A case where the polymer was not dissolved therein is taken as poor. The results are shown in Table 1.

(Solubility in 1,3-Dimethyl-2-Imidazolidinone 1)

The above-described polymer was mixed with 1,3-dimethyl-2-imidazolidinone to be 10% by weight. A state of dissolution was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution was colored, or a case where the solution became cloudy is taken as marginal. A case where the polymer was not dissolved therein is taken as poor. The results are shown in Table 1.

(Solubility in 1,3-Dimethyl-2-Imidazolidinone 2)

The above-described polymer was mixed with 1,3-dimethyl-2-imidazolidinone to be 20% by weight. A state of dissolution was visually observed after mixing. A case where the polymer was completely dissolved therein is taken as good. A case where bulkiness of the polymer after mixing was visually reduced than bulkiness of the polymer before mixing, but the polymer remained without being dissolved, or a case where the solution was colored, or a case where the solution became cloudy is taken as marginal. A case where the polymer was not dissolved therein is taken as poor. The results are shown in Table 1.

(Manufacture of Thin Film)

The above-described polymer was dissolved in NMP to be 2.5% by weight, and filtrated with a filter having a pore size of 0.2 μm to obtain an application liquid. The application liquid obtained was spin-coated on a synthetic quartz substrate having a size of 2 cm×2 cm and a thickness of 1 mm at 2000 rpm for 60 seconds, and uniformly coated thereon.

Then, the resulting material was heated and dried on a hot plate at 200° C. for 30 minutes to evaporate the solvent to form a thin film of the polymer thereon.

(Optical Evaluation)

The thin film obtained was measured using a spectroscopic ellipsometer M-200003 (made by J.A. Woollam Company, attached with NIR option), and analyzed by a general dispersion formulation model to determine a refractive index n and an extinction coefficient k in the wavelength range of 190 to 1700 nm. Then, $n_D$, the Abbe number and $k_{400}$ determined are shown in Table 1.

In addition, the Abbe number means a numerical value representing wavelength dispersion of the refractive index, and was calculated according to an equation; $(n_D-1)/(n_F-n_C)$. Then; $n_D$, $n_F$ and $n_C$ are as described below:

$n_D$: a refractive index of a D line (589.3 nm);
$n_F$: a refractive index of an F line (486.1 nm); and
$n_C$: a refractive index of a C line (656.3 nm).

Then, $k_{400}$ represents the extinction coefficient k in light having a wavelength of 400 nm, and represents that, as $k_{400}$ is smaller, transparency in a visible light wavelength region is higher, and visually observed coloration is weaker.

Examples 2 to 13 and Comparative Example 1

In Examples 2 to 9, Examples 11 to 13 and Comparative Example 1, a polymer was manufactured and evaluated in the same manner as in Example 1 except that a diamine monomer, a dichloro monomer, a polymerization solvent, a polymerization atmosphere and a polymerization temperature shown in Tables 1 and 2 were used. The results are shown in Tables 1 and 2.

In Example 10, a polymer was manufactured and evaluated in the same manner as in Example 1 except that a dichloro monomer was put in a 100 mL three-necked flask in place of the diamine monomer and a diamine monomer was used in place of the dichloro monomer to be charged thereinto with the syringe. The results are shown in Tables 1 or 2.

In Table 1, both super dehydrated DMA and super dehydrated DMF are made by Wako Pure Chemical Industries, Ltd.

In Table 2, all of super dehydrated NMP, guaranteed DMA and super dehydrated DMA are made by Wako Pure Chemical Industries, Ltd.

TABLE 1

|  | Example 1 | Example 2 | Example 3 | Example 4 | Example 5 | Example 6 | Example 7 |
|---|---|---|---|---|---|---|---|
| Diamine monomer | p-Phenylenediamine | p-Phenylenediamine | p-Phenylenediamine | p-Phenylenediamine | p-Phenylenediamine | p-Phenylenediamine | p-Phenylenediamine |
| Dichloro monomer | A-1 | A-1 | A-1 | A-1 | A-1 | A-1 | A-1 |
| Polymerization solvent | Super dehydrated DMA | Super dehydrated DMA | Super dehydrated DMA | Super dehydrated DMA | Super dehydrated DMA | Super dehydrated DMA | Super dehydrated DMA |
| Polymerization atmosphere | Nitrogen | Nitrogen | Nitrogen | Nitrogen | Nitrogen | Nitrogen | Nitrogen |
| Polymerization temperature (° C.) | 150 | 130 | 120 | 100 | 80 | 60 | 150 |
| Mp | 2593 | 2651 | 4453 | 5482 | 5997 | 8328 | 5205 |
| Powder color | White | Pale yellow | Pale yellow | Yellow | Yellow | Orange | Yellow |
| Solubility in isophorone 1 | Good | Good | Good | Marginal | Marginal | Marginal | Marginal |
| Solubility in isophorone 2 | Marginal | Marginal | Marginal | Marginal | Marginal | Marginal | Marginal |
| Solubility in PGME 1 | Good | Good | Marginal | Marginal | Marginal | Marginal | Marginal |
| Solubility in PGME 2 | Marginal | Marginal | Marginal | Marginal | Marginal | Marginal | Marginal |
| Solubility in DMA 1 | Good | Good | Good | Good | Good | Good | Good |
| Solubility in DMA 2 | Good | Good | Good | Good | Good | Good | Good |
| Solubility in DMF 1 | Good | Good | Good | Good | Good | Good | Good |
| Solubility in DMF 2 | Good | Good | Good | Good | Good | Good | Good |
| Solubility in NMP 1 | Good | Good | Good | Good | Good | Good | Good |
| Solubility in NMP 2 | Good | Good | Good | Good | Good | Good | Good |
| Solubility in 1,3-dimethyl-2-imidazolidinone 1 | Good | Good | Good | Good | Good | Good | Good |
| Solubility in 1,3-dimethyl-2-imidazolidinone 2 | Good | Good | Good | Good | Good | Good | Good |
| $n_D$ | 1.9918 | 1.9324 | 1.9547 | 1.9814 | 1.9681 | 1.9482 | 1.9324 |
| Abbe number | 11.17 | 11.95 | 11.45 | 11.23 | 11.37 | 11.84 | 11.82 |
| $k_{400}$ | $1.95 \times 10^{-3}$ | $3.45 \times 10^{-3}$ | $3.75 \times 10^{-3}$ | $2.58 \times 10^{-2}$ | $5.56 \times 10^{-2}$ | $9.35 \times 10^{-2}$ | $3.24 \times 10^{-2}$ |

TABLE 2

|  | Example 8 | Example 9 | Example 10 | Example 11 | Example 12 | Example 13 | Comp. Ex. 1 |
|---|---|---|---|---|---|---|---|
| Diamine monomer | p-Phenylenediamine | p-Phenylenediamine | p-Phenylenediamine | m-Phenylenediamine | m-Phenylenediamine | m-Phenylenediamine | p-Phenylenediamine |
| Dichloro monomer | A-1 | A-1 | A-1 | A-1 | A-1 | A-1 | A-1 |
| Polymerization solvent | Super dehydrated NMP | Guaranteed DMA | Super dehydrated DMA | Super dehydrated DMA | Super dehydrated DMA | Guaranteed DMA | Super dehydrated NMP |
| Polymerization atmosphere | Nitrogen | Air | Nitrogen | Nitrogen | Nitrogen | Nitrogen | Nitrogen |
| Polymerization temperature (° C.) | 100 | 120 | 150 | 150 | 120 | 120 | 150 |
| Mp | 6258 | 4312 | 1529 | 3744 | 3854 | 3657 | 19632 |
| Powder color | Orange | Deep orange | Yellow | White | Pale yellow | Yellow | Yellow |
| 10% by weight in isophorone | Marginal | Marginal | Marginal | Good | Good | Good | Poor |
| 20% by weight in isophorone | Marginal | Marginal | Marginal | Marginal | Marginal | Marginal | Poor |
| 10% by weight in PGME | Marginal | Marginal | Marginal | Marginal | Marginal | Marginal | Poor |
| 20% by weight in PGME | Marginal | Marginal | Marginal | Marginal | Marginal | Marginal | Poor |

TABLE 2-continued

|  | Example 8 | Example 9 | Example 10 | Example 11 | Example 12 | Example 13 | Comp. Ex. 1 |
|---|---|---|---|---|---|---|---|
| Solubility in DMA 1 | Good | Good | Good | Good | Good | Good | Good |
| Solubility in DMA 2 | Good | Good | Good | Good | Good | Good | Good |
| Solubility in DMF 1 | Good | Good | Good | Good | Good | Good | Good |
| Solubility in DMF 2 | Good | Good | Good | Good | Good | Good | Good |
| Solubility in NMP 1 | Good | Good | Good | Good | Good | Good | Good |
| Solubility in NMP 2 | Good | Good | Good | Good | Good | Good | Good |
| Solubility in 1,3-dimethyl-2-imidazolidinone 1 | Good | Good | Good | Good | Good | Good | Good |
| Solubility in 1,3-dimethyl-2-imidazolidinone 2 | Good | Good | Good | Good | Good | Good | Good |
| $n_D$ | 1.9526 | 1.9617 | 1.9645 | 1.9272 | 1.9358 | 1.9189 | 1.9274 |
| Abbe number | 11.87 | 11.51 | 11.49 | 12.56 | 12.34 | 12.68 | 11.94 |
| $k_{400}$ | $8.41 \times 10^{-2}$ | $2.9 \times 10^{-1}$ | $5.74 \times 10^{-2}$ | $2.08 \times 10^{-3}$ | $4.25 \times 10^{-3}$ | $1.76 \times 10^{-2}$ | $1.54 \times 10^{-2}$ |

Examples 14 to 19

A polymer was manufactured and evaluated in the same manner as in Example 1 except that an end-capping agent shown in Table 3 was used in place of 4-isopropylaniline. The results are shown in Table 3.

TABLE 3

|  | Example 14 | Example 15 | Example 16 | Example 17 | Example 18 | Example 19 |
|---|---|---|---|---|---|---|
| End-capping agent | Aniline | n-Butylamine | 3-(Trimethoxy-silyl)propylamine | 3-[3'-(Trimethoxy-silyl)amino-propyl]amino-propyl amine | Hexamethyl-disilazane | None |
| Mp | 2527 | 2538 | 2603 | 2635 | 2581 | 2501 |
| Powder color | Pale yellow | Pale yellow | Pale yellow | Pale yellow | Pale yellow | Yellow |
| 10% by weight in isophorone | Good | Good | Good | Good | Good | Marginal |
| 20% by weight in isophorone | Marginal | Good | Good | Good | Good | Marginal |
| 10% by weight in PGME | Good | Good | Good | Good | Good | Marginal |
| 20% by weight in PGME | Marginal | Marginal | Good | Good | Marginal | Marginal |
| Solubility in DMA 1 | Good | Good | Good | Good | Good | Good |
| Solubility in DMA 2 | Good | Good | Good | Good | Good | Good |
| Solubility in DMF 1 | Good | Good | Good | Good | Good | Good |
| Solubility in DMF 2 | Good | Good | Good | Good | Good | Good |
| Solubility in NMP 1 | Good | Good | Good | Good | Good | Good |
| Solubility in NMP 2 | Good | Good | Good | Good | Good | Good |
| Solubility in 1,3-dimethyl-2-imidazolidinone 1 | Good | Good | Good | Good | Good | Good |
| Solubility in 1,3-dimethyl-2-imidazolidinone 2 | Good | Good | Good | Good | Good | Good |
| $n_D$ | 1.9313 | 1.9225 | 1.91 | 1.8895 | 1.9352 | 1.9147 |
| Abbe number | 11.21 | 10.97 | 11.18 | 11.55 | 11.1 | 11.25 |
| $k_{400}$ | $3.10 \times 10^{-3}$ | $6.04 \times 10^{-3}$ | $4.84 \times 10^{-3}$ | $2.40 \times 10^{-3}$ | $5.17 \times 10^{-3}$ | $1.42 \times 10^{-2}$ |

Example 20

A polymer (mixture of a polymer represented by the following formula (B-2) and a polymer represented by the following formula (B-2') (wherein, each formula indicates that a structural unit in brackets is repeated.)) was obtained by manufacturing the polymer in the same manner as in Example 1 except that the compound A-2 obtained in Synthesis Example 2 was used as a dichloro monomer in place of the compound A-1. The polymer obtained was evaluated in the same manner as in Example 1. The results are shown in Table 4.

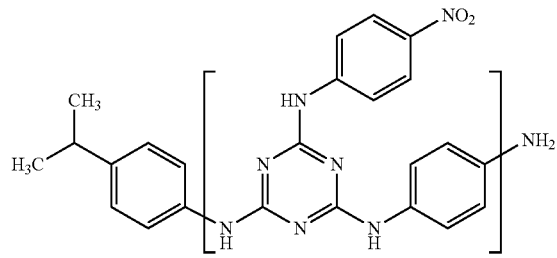

(B-2)

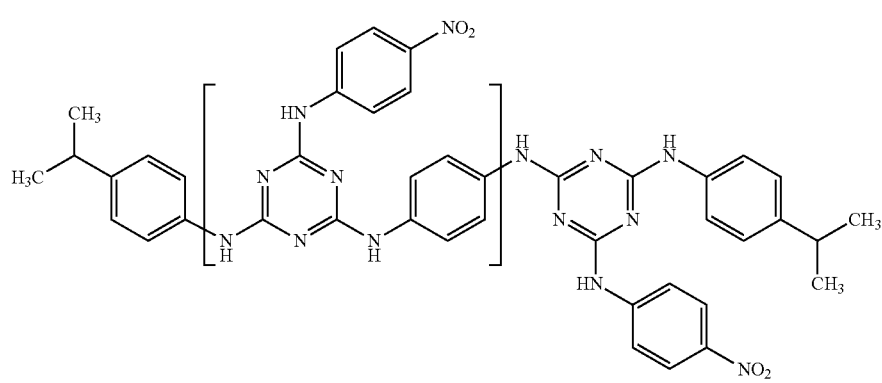

(B-2')

Example 21

A polymer (mixture of a polymer represented by the following formula (B-3) and a polymer represented by the following formula (B-3') (wherein, each formula indicates that a structural unit in brackets is repeated.)) was obtained by manufacturing the polymer in the same manner as in Example 1 except that the compound A-3 obtained in Synthesis Example 3 was used as a dichloro monomer in place of the compound A-1. The polymer obtained was evaluated in the same manner as in Example 1. The results are shown in Table 4.

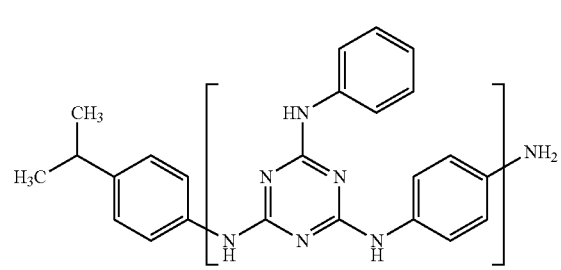

(B-3)

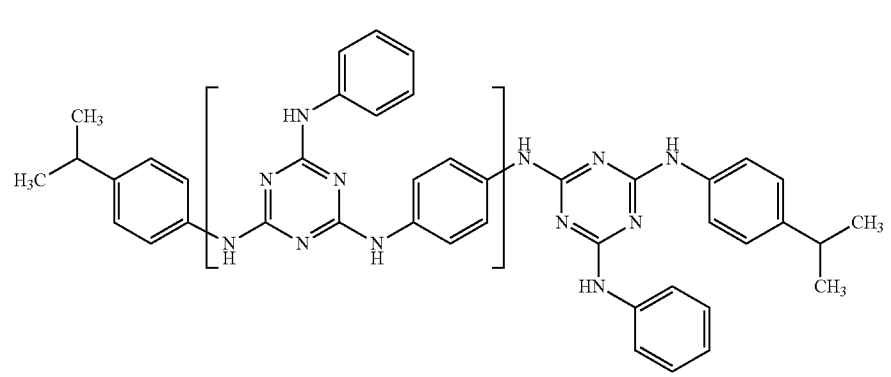

(B-3')

TABLE 4

| | Example 20 | Example 21 |
|---|---|---|
| Diamine monomer | p-Phenylenediamine | p-Phenylenediamine |
| Dichloro monomer | A-2 | A-3 |
| Mp | 2456 | 2548 |
| Powder color | Deep orange | White |
| 10% by weight in isophorone | Good | Good |
| 20% by weight in isophorone | Marginal | Marginal |
| 10% by weight in PGME | Good | Good |
| 20% by weight in PGME | Marginal | Marginal |
| Solubility in DMA 1 | Good | Good |
| Solubility in DMA 2 | Good | Good |
| Solubility in DMF 1 | Good | Good |
| Solubility in DMF 2 | Good | Good |
| Solubility in NMP 1 | Good | Good |
| Solubility in NMP 2 | Good | Good |
| Solubility in 1,3-dimethyl-2-imidazolidinone 1 | Good | Good |
| Solubility in 1,3-dimethyl-2-imidazolidinone 2 | Good | Good |
| $n_D$ | 1.9966 | 1.7406 |
| Abbe number | 7.03 | 14.08 |
| $k_{400}$ | $3.18 \times 10^{-1}$ | $1.99 \times 10^{-3}$ |

INDUSTRIAL APPLICABILITY

A triazine ring-containing polymer and a composition according to the invention can be used for a thin film, a film, a transparent plate, a lens or the like, and the thin film, the film, the transparent plate or the lens according to the invention can be used for an electronic device, a light-emitting device, an optical device or the like.

Several embodiments and/or Examples of the invention have been described in detail above, but those skilled in the art will readily make a great number of modifications to the exemplary embodiments and/or Examples without substantially departing from new teachings and advantageous effects of the invention. Accordingly, all such modifications are included within the scope of the invention.

The entire contents of the description of the Japanese application serving as a basis of claiming the priority concerning the present application to the Paris Convention are incorporated by reference herein.

The invention claimed is:

1. A triazine ring-containing polymer, comprising a structural unit represented by the following formula (1), wherein a peak top molecular weight obtained by gel permeation chromatography is 19,000 or less and an end group is —NHR¹ or —N(R¹)₂, wherein R¹ independently represents a n-butyl group, a s-butyl group, an isobutyl group a t-butyl group; a n-pentyl group, a n-hexy group, a n-heptyl group and a n-octyl group —Si(OR")₃, a group which is a combination of —Si(OR")₃ and a divalent group; and R" represents a methyl group;

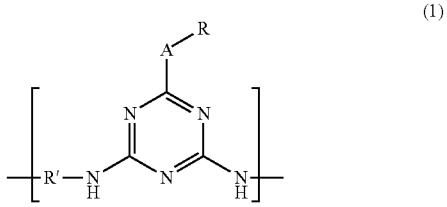

(1)

wherein; A represents a divalent group selected from the group consisting of —NH—, —NR"—, —NH—(C=O)—, —NR"—(C=O)—, —S— and —O—;

R' represents a divalent aliphatic hydrocarbon group, a divalent aromatic hydrocarbon group, or a divalent group which is a combination of (i) one or more selected from the group consisting of one or more divalent aliphatic hydrocarbon groups and one or more divalent aromatic hydrocarbon groups, and (ii) one or more selected from the group consisting of a single bond, —S—, —S(=O)₂—, —NH—, —NR"—, —(C=O)—NH—, —O—(C=O)—O—, —(C=O)—O— and —(C=O)—; and R' may be further substituted with a substituent;

R represents a hydrogen atom, an aliphatic hydrocarbon group, an aromatic hydrocarbon group, an aliphatic hydrocarbon group having a group which is a combination of an aromatic hydrocarbon group and one or more selected from the group consisting of a single bond, —S—, —S(=O)₂—, —NH—, —NR"—, —(C=O)—NH—, —O—(C=O)—O—, —(C=O)—O— and —(C=O)—, an aromatic hydrocarbon group having a group which is a combination of an aliphatic hydrocarbon group and one or more selected from the group consisting of a single bond, —S—, —S(=O)₂—, —O—, —NR"—, —(C=O)—NH—, —O—(C=O)—O—, —(C=O)—O— and —(C=O)—, or an acetyl group; and R may be further substituted with a substituent;

R" represents an aliphatic hydrocarbon group, an aromatic hydrocarbon group, or a group which is a combination of one or more aliphatic hydrocarbon groups and one or more aromatic hydrocarbon groups; and when a plurality of R" exist, the plurality of R" may be the same with or different from each other.

* * * * *